(12) United States Patent
Nakra et al.

(10) Patent No.: US 10,360,160 B2
(45) Date of Patent: Jul. 23, 2019

(54) SYSTEM AND METHOD FOR ADAPTIVE CACHE REPLACEMENT WITH DYNAMIC SCALING OF LEADER SETS

(71) Applicant: Samsung Electronics Co., Ltd., Suwon-si, Gyeonggi-do (KR)

(72) Inventors: Tarun Nakra, Austin, TX (US); Kevin Heuer, Austin, TX (US); Khang Nguyen, Round Rock, TX (US)

(73) Assignee: Samsung Electronics Co., Ltd. (KR)

( * ) Notice: Subject to any disclaimer, the term of this patent is extended or adjusted under 35 U.S.C. 154(b) by 223 days.

(21) Appl. No.: 15/331,803

(22) Filed: Oct. 21, 2016

(65) Prior Publication Data

US 2018/0052781 A1 Feb. 22, 2018

Related U.S. Application Data

(60) Provisional application No. 62/376,362, filed on Aug. 17, 2016.

(51) Int. Cl.
| | |
|---|---|
| *G06F 12/00* | (2006.01) |
| *G06F 12/128* | (2016.01) |
| *G06F 12/0891* | (2016.01) |
| *G06F 12/0897* | (2016.01) |
| *G06F 12/123* | (2016.01) |

(52) U.S. Cl.
CPC ........ *G06F 12/128* (2013.01); *G06F 12/0891* (2013.01); *G06F 12/0897* (2013.01); *G06F 12/123* (2013.01); *G06F 2212/1021* (2013.01); *G06F 2212/60* (2013.01)

(58) Field of Classification Search
None
See application file for complete search history.

(56) References Cited

U.S. PATENT DOCUMENTS

2015/0100739 A1 4/2015 Wang et al.

OTHER PUBLICATIONS

Moinuddin et al, Set-Dueling-Controlled Adaptive Insertion for High-Performance Caching (2008).*

(Continued)

*Primary Examiner* — David Yi
*Assistant Examiner* — Craig S Goldschmidt
(74) *Attorney, Agent, or Firm* — Renaissance IP Law Group LLP

(57) ABSTRACT

According to one general aspect, an apparatus may include a cache and a cache replacement unit. The cache may be arranged in a plurality of cache sets each configured to store data. A number of cache sets are designated as leader cache sets and each leader cache set is associated with a first replacement policy or a second replacement policy. The cache replacement unit may be configured to monitor an effectiveness of the first replacement policy and, at least, the second replacement policy to accurately predict cache line replacement. The cache replacement unit may be configured to select the first replacement policy or the second replacement policy to be a dominant replacement policy. The cache replacement unit may be configured to dynamically scale the number of cache sets that are designated as leader cache sets based at least in part upon the effectiveness of the dominant replacement policy.

20 Claims, 6 Drawing Sheets

(56) References Cited

OTHER PUBLICATIONS

Fang et al., "Prediction Oriented Analysis of Optimal Replacement", Computer Science and Engineering Conference (ICSEC), 2013 International IEEE, 2013, pp. 131-135.
Qureshi et al., "Set-Dueling-Controlled Adaptive Insertion for High-Performance Caching", Micro IEEE 28.1 (2008), Jan./Feb. 2008, pp. 91-98.
Rodriguez-Rodriguez et al., "Reducing Writes in Phase-Change Memory Environments by Using Efficient Cache Replacement Policies", Proceedings of the Conference on Design, Automation and Test in Europe, EDA Consortium, EDAA 2013, 4 pages.

\* cited by examiner

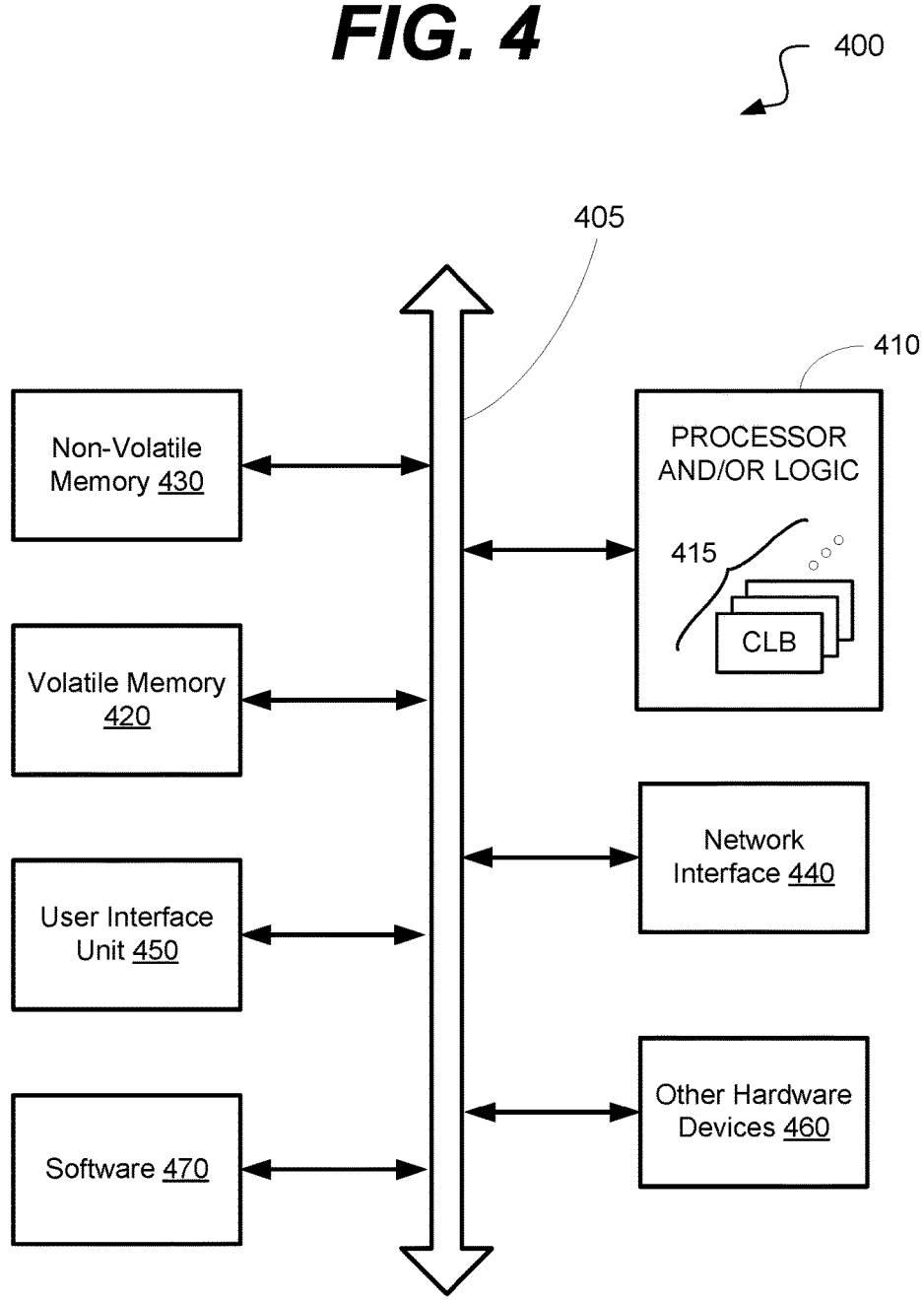

SYSTEM AND METHOD FOR ADAPTIVE CACHE REPLACEMENT WITH DYNAMIC SCALING OF LEADER SETS

CROSS-REFERENCE TO RELATED APPLICATION

This application claims priority under 35 U.S.C. § 119 to Provisional Patent Application Ser. No. 62/376,362, entitled "SYSTEM AND METHOD FOR ADAPTIVE CACHE REPLACEMENT WITH DYNAMIC SCALING OF LEADER SETS" filed on Aug. 17, 2016. The subject matter of this earlier filed application is hereby incorporated by reference.

TECHNICAL FIELD

This description relates to storing data, and more specifically to cache management.

BACKGROUND

In computing, a cache is generally a hardware component that stores data so future requests for that data can be served faster. The data stored in a cache might be the result of an earlier computation, and/or the duplicate of data stored elsewhere. A cache hit occurs when requested data can be found in a cache, while a cache miss occurs when that requested data cannot be found in the cache. Cache hits are served by reading data from the cache, which is faster than reading the data from a slower data store or memory. The more requests that can be served from the cache, the faster the system generally performs.

To be cost-effective and to enable efficient use of data, caches are relatively small. Nevertheless, caches have proven themselves in many areas of computing because typical computer applications tend to access data in recognizable patterns. These patterns typically exhibit a locality of reference (i.e. data requested in the future tends to be similar in some way to previously requested data). Some access patterns exhibit temporal locality, i.e. data may be requested again if it has been recently requested already. Other patterns exhibit spatial locality, which refers to requests for data that is physically stored close to data that has been already requested. Other forms of locality exist.

Generally a cache line or block is a basic unit of cache storage and may include multiple bytes and/or words of data. A cache set is more akin to a row in the cache, and generally includes a number of rows as determined by the design of the cache (e.g., direct mapped, set associative, fully associative).

Typically, due to the small size of the cache, one piece of data must be removed in order to put a new piece of data in. Often, the cache replaces lines based on age (e.g., most recently used (MRU) to least recently used (LRU)). A number of other cache replacement policies may be employed. Static cache replacement policies include LRU that predicts temporal locality and are not resistant to thrashing; LRU insertion policy (LIP) that assumes no temporal locality and does not adapt to changes in working set; bi-modal that varies insertion position using static probabilities; re-reference prediction (RRIP) that filters temporal data from other non-temporal (or dead) lines and are not resistant to thrashing. However, each policy has advantages and disadvantages and no one policy is optimal for each situation.

SUMMARY

According to one general aspect, an apparatus may include a cache and a cache replacement unit. The cache may be arranged in a plurality of cache sets, each cache set configured to store data, wherein a number of cache sets are designated as leader cache sets and each leader cache set is associated with either a first replacement policy or, at least, a second replacement policy. The cache replacement unit may be configured to monitor an effectiveness of the first replacement policy and, at least, the second replacement policy to accurately predict cache line replacement. The cache replacement unit may be configured to select, based upon the effectiveness, either the first replacement policy and, at least, the second replacement policy to be a dominant replacement policy. The cache replacement unit may be configured to dynamically scale the number of cache sets that are designated as leader cache sets based at least in part upon the effectiveness of the dominant replacement policy.

According to another general aspect, a method may include arranging a cache in a plurality of cache sets, each cache set configured to store data, wherein a number of cache sets are designated as leader cache sets and each leader cache set is associated with either a first replacement policy or, at least, a second replacement policy. The method may include monitoring an effectiveness of the first replacement policy and, at least, the second replacement policy to accurately predict cache line replacement, whichever replacement policy is the more effective replacement policy is deemed a dominant replacement policy. The method may include dynamically scaling the number of cache sets that are designated as leader cache sets based at least in part upon the effectiveness of the dominant replacement policy.

According to another general aspect, an apparatus may include an execution unit a cache, and a memory manager circuit. The execution circuit may be configured to execute instructions and request data from a cache. The cache may be arranged in a plurality of cache sets, each cache set configured to store data, wherein a number of cache sets are designated as leader cache sets and each leader cache set is associated with either a first replacement policy or, at least, a second replacement policy. The memory manager circuit may be configured to monitor an effectiveness of the first replacement policy and, at least, the second replacement policy to accurately predict cache line replacement, select, based upon the effectiveness, either the first replacement policy and, at least, the second replacement policy to be a dominant replacement policy, and dynamically scale, based at least in part upon the effectiveness of the dominant replacement policy, the number of cache sets that are designated as leader cache sets.

The details of one or more implementations are set forth in the accompanying drawings and the description below. Other features will be apparent from the description and drawings, and from the claims.

A system and/or method for storing data, and more specifically to cache management, substantially as shown in and/or described in connection with at least one of the figures, as set forth more completely in the claims.

BRIEF DESCRIPTION OF THE DRAWINGS

FIG. 4 is a schematic block diagram of an information processing system that may include devices formed according to principles of the disclosed subject matter.

Like reference symbols in the various drawings indicate like elements.

DETAILED DESCRIPTION

Figure 1:
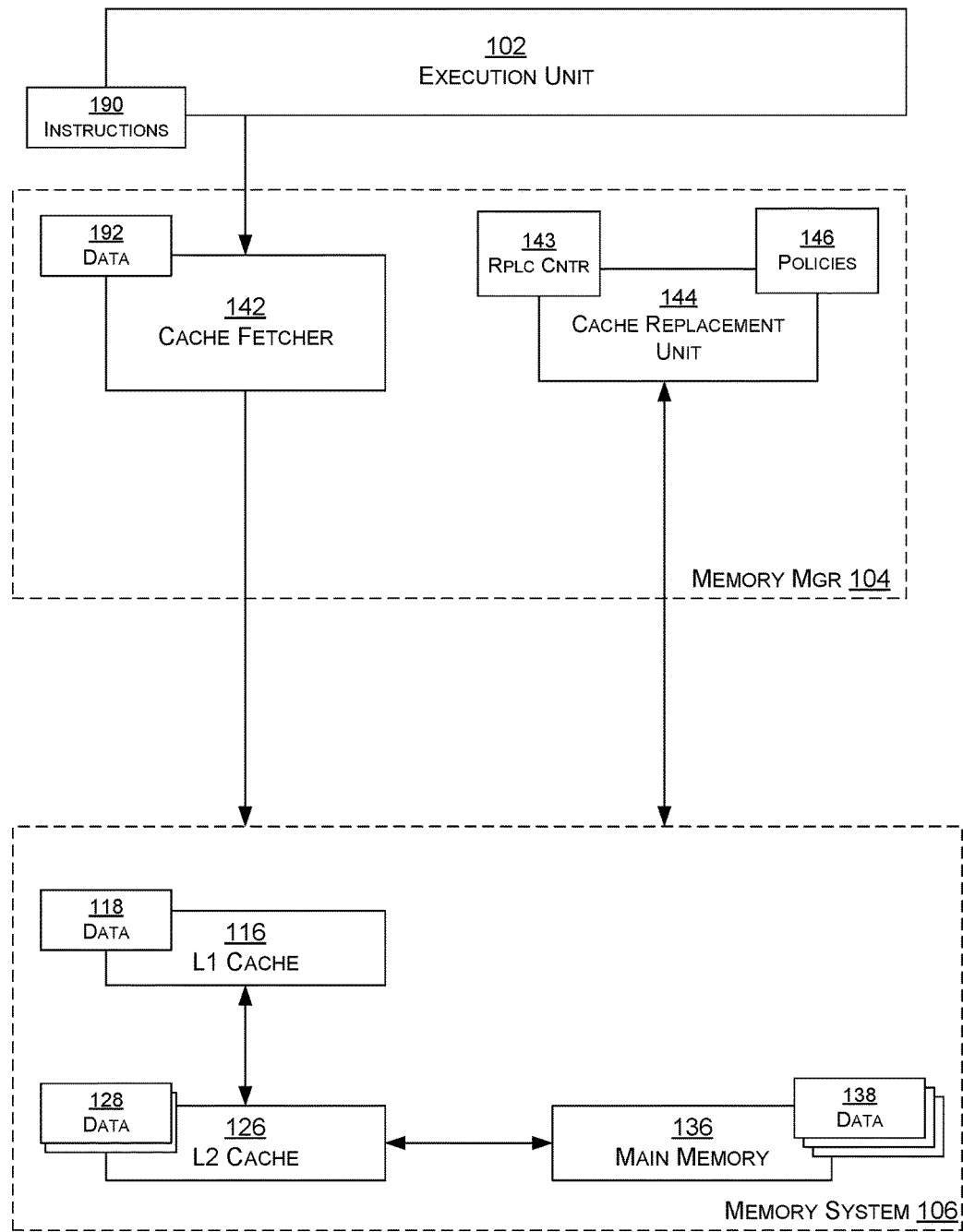
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a microprocessor or a system-on-a-chip (SoC) or other computing apparatus.

In the illustrated embodiment, the system 100 may include an execution unit 102. The execution unit 102 may include a circuit or group of logic devices configured to perform one or more logic operations. Examples of execution units 102 may include, but are not limited to floating point units, load/store units, instruction decode units, arithmetic logic units. In the illustrated embodiment, the execution unit 102 may be configured to execute one or more instructions 190.

The execution unit 102 may also request data. This data may be stored in a memory system 106. The execution unit 102's access to the memory system 106 may be controlled or managed by the memory manager unit or circuit 104.

In various embodiments, the memory system 106 may include a plurality of tiers or levels of cache. In the illustrated embodiment, the memory system 106 may include a level 1 (L1) cache 116 that stores a relatively small sub-set of data 118. The memory system 106 may include a level 2 (L2) cache 126 that stores a relatively moderate sub-set of data 128. In various embodiments, the L2 cache 126 may include a copy of all of the data 118 stored by the L1 cache 116. The memory system 106 may include a main memory 136 that stores a relatively large set of data 138. In various embodiments, the main memory 136 may include a copy of all of the data 128 stored by the L2 cache 126.

In the illustrated embodiment, the memory manager 104 may include a cache fetcher circuit 142. The cache fetcher 142 may request data (fetched data 192) from the memory system 106. In various embodiments, data request may be made to the L1 cache 116, and if not fulfilled there, cascaded through the L2 cache 126 and the main memory 136. In such an embodiment, if the data 192 is found within the L1 cache 116, a cache hit is said to have occurred. If the data 192 is not found with the L1 cache 116, then a cache miss is said to have occurred. In one embodiment, a memory manager could be associated per cache level within the memory system. Another embodiment as in FIG. 1, would have a central memory manager for all the cache levels.

When a cache miss occurs, the desired data 192 is fetched from a lower memory tier (e.g., the L2 cache 126) and placed in the L1 cache 116. Usually this results in a piece of data 118 already stored in the L1 cache 116 being evicted and the new data 192 (copied from data 128, for example) taking its place.

In various embodiments, it is desirable for cache misses to occur as infrequently as possible. One way in which a cache miss can compound the ramifications of such an event is to evict data from the L1 cache 116 that will be subsequently used (e.g., by a future instruction 190). As described above, a number of cache replacement policies may be employed to predict or determine which piece of data will not be used in the future and may therefore be safely evicted.

In the illustrated embodiment, the memory manager 104 may include a cache replacement unit or circuit 144. In various embodiments, the cache replacement unit 144 may be configured to determine which cache lines or sets are to be replaced when data (e.g., data 118) needs to be evicted from a tier of the memory system 106.

As described above, a number of possible replacement policies, techniques, or schemes may be available, and each may have advantages or disadvantages in various scenarios. For example, one policy may be good when streaming video data, another may be good when doing heavy computations, and a third may be good when frequently multi-tasking. As described above, it is difficult to match a desirable cache replacement policy with a user's desires and the instructions 190 the user desires to execute at any given moment.

In the illustrated embodiment, the cache replacement unit 144 may be configured to simultaneously perform a plurality of different cache replacement policies 146. In such an embodiment, the cache replacement unit 144 may be configured to determine which cache replacement policy 146 is optimal or dominant at any given time.

Figure 2A:
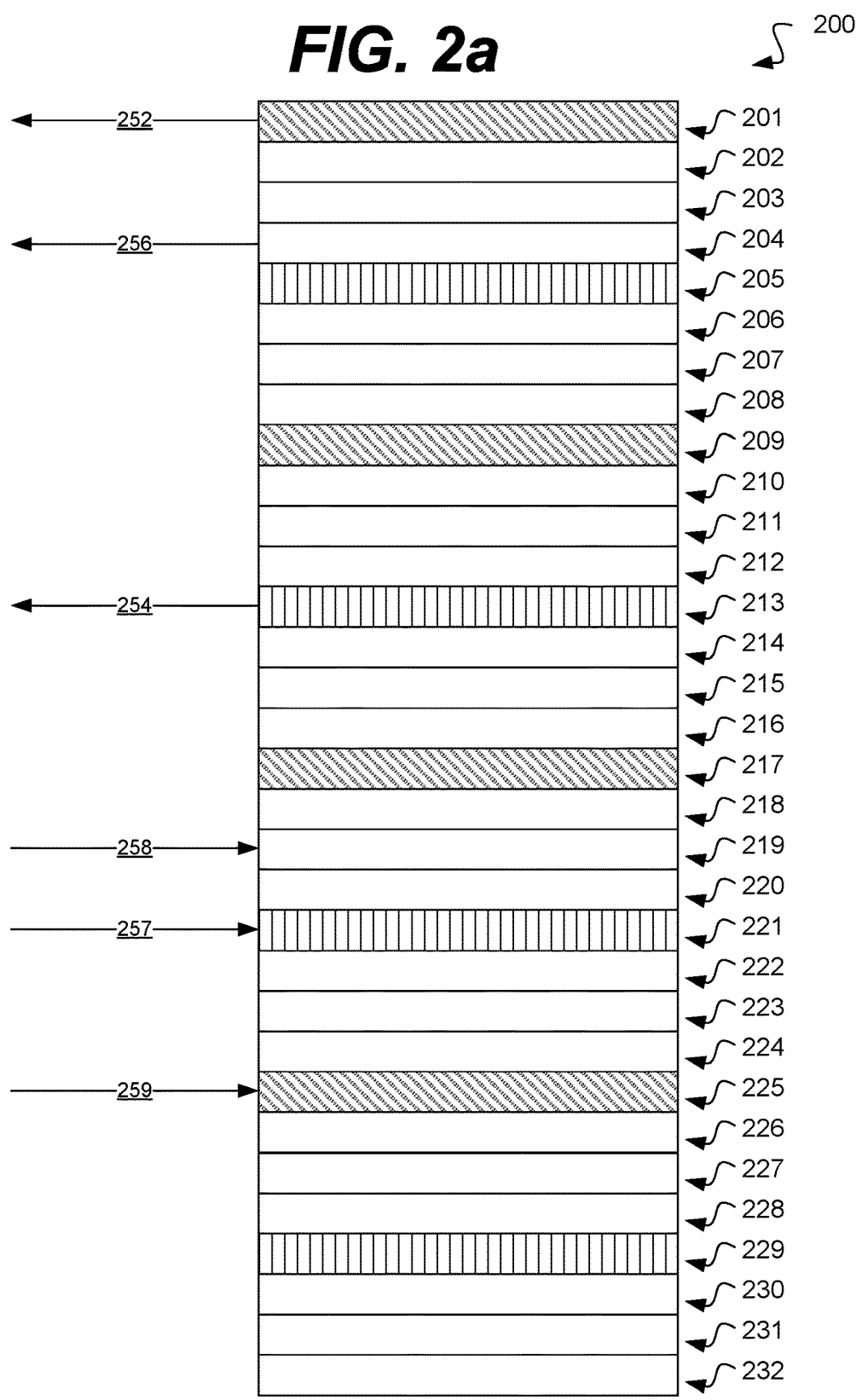
FIG. 2A is a block diagram of an example embodiment of a system in accordance with the disclosed subject matter.
Figure 2B:
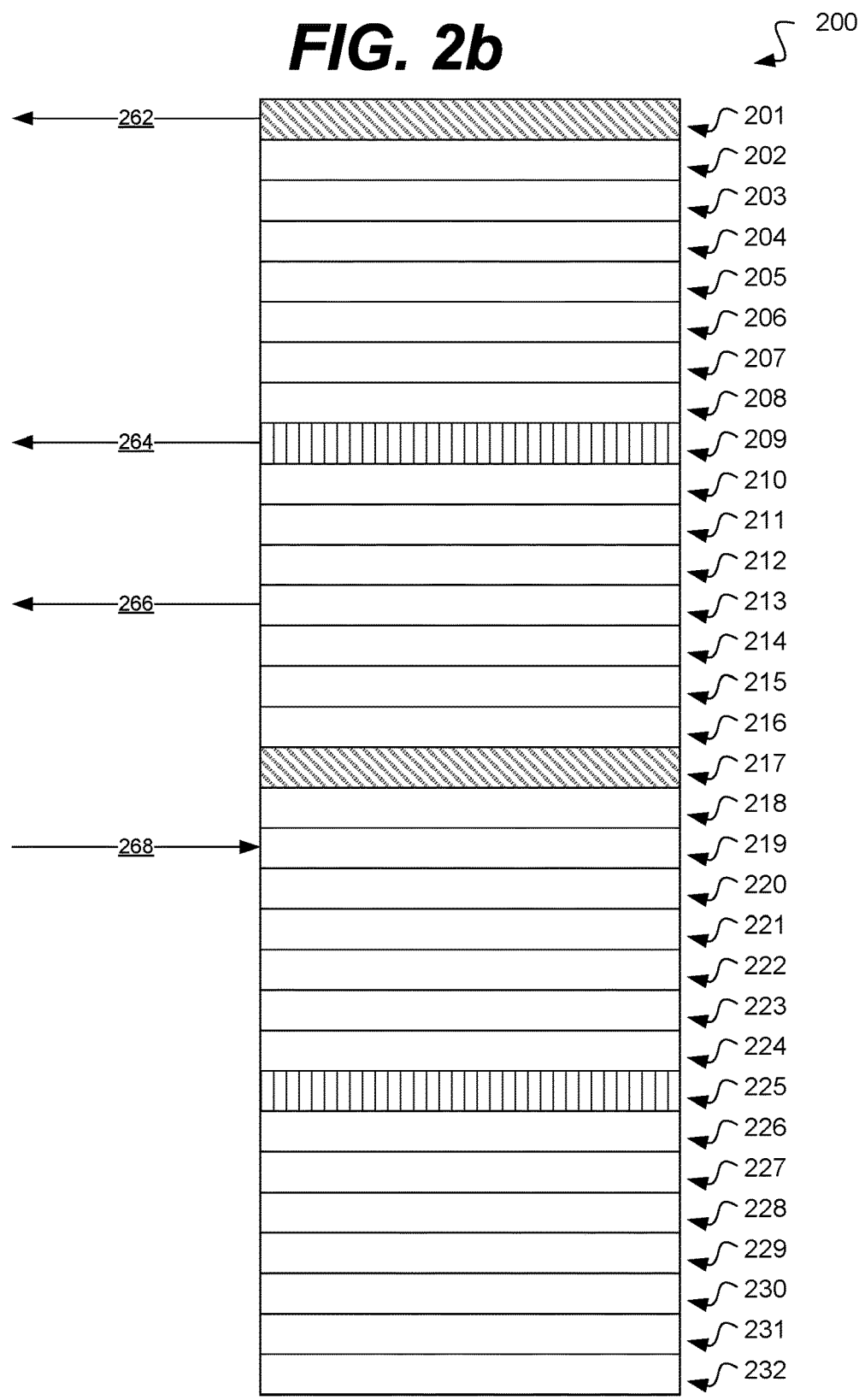
FIG. 2B is a block diagram of an example embodiment of a system in accordance with the disclosed subject matter.
Figure 2C:
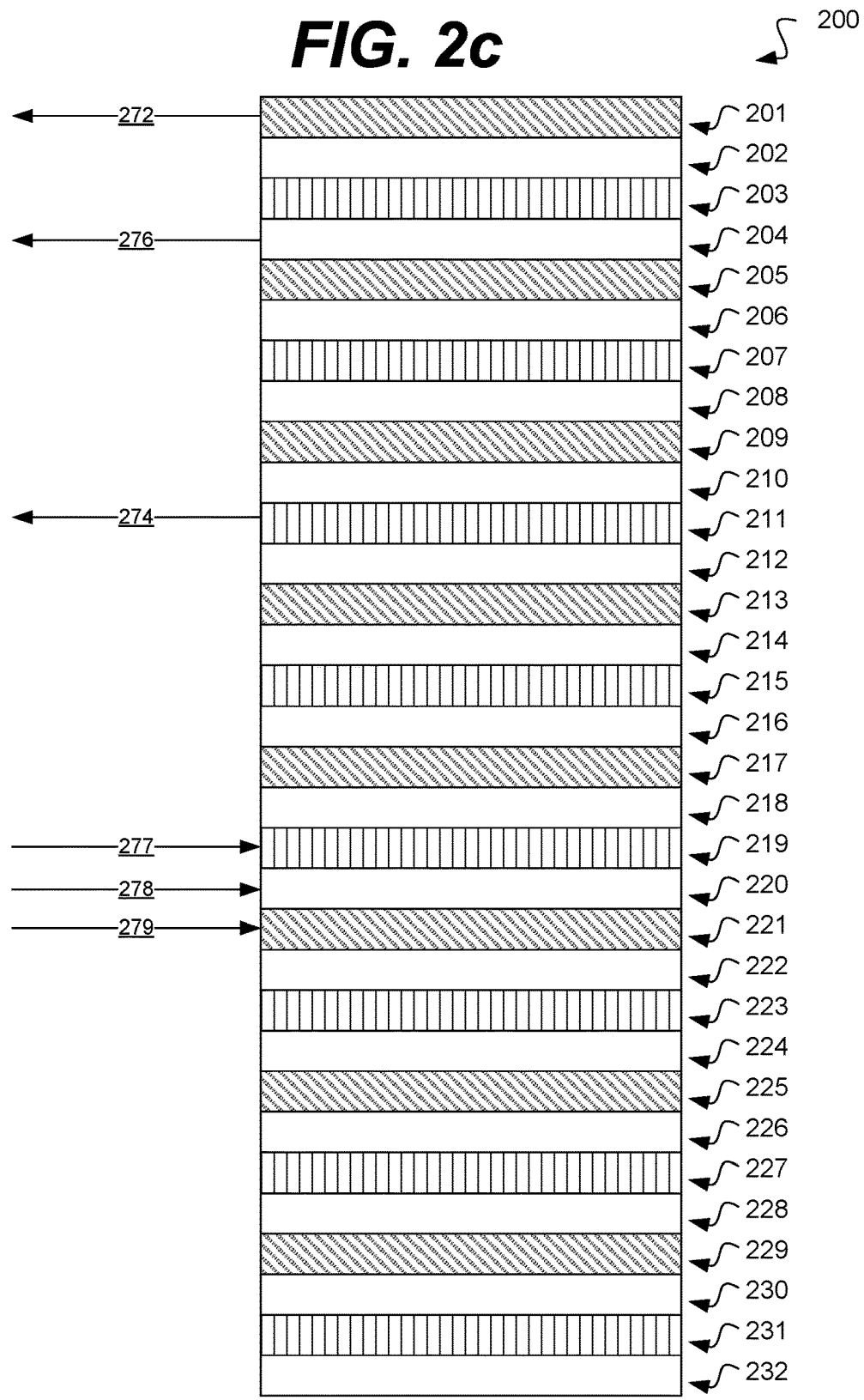
FIG. 2C is a block diagram of an example embodiment of a system in accordance with the disclosed subject matter.

As illustrated and described in more detail in reference to FIGS. 2A, 2B, and 2C, in such an embodiment, the cache replacement unit 144 may be configured to divide the cache (e.g., the L1 cache 116) into a number of cache sets. The cache replacement unit 144 may further identify a minority of the cache sets as leader cache sets. The remaining or majority of cache sets may be non-leader cache sets.

A leader cache set (or leader set) is a cache set whose performance (e.g., tendency to incorrectly or correct replace cache sets or cache lines) will be monitored by the cache replacement unit 144. Furthermore, each of those leader cache sets will be associated with one of a plurality of candidate replacement policies 146. Therefore, each group of leader cache sets will act as little testbeds or sample groups for testing how well a particular cache replacement policy 146 is performing with the active set of data (e.g., data 118).

As the data is replaced (e.g., data 118 being replaced with data 192 via cache misses), each leader cache set will employ the policy 146 associated with it to replace its respective pieces of data. For example, leader cache sets associated with a first cache replacement policy (Policy A) will employ Policy A to determine which cache line should be replaced when a cache miss occurs to that leader cache set. Likewise, leader cache sets associated with a second cache replacement policy (Policy B) will employ Policy B to determine which cache line should be replaced when a cache miss occurs to that leader cache set.

Ideally as the data is replaced, one of the candidate replacement policies will show itself to be more-correct or dominant in correctly determining which cache lines or data should be replaced or evicted. In the illustrated embodiment, the dominance or effectiveness of each candidate cache replacement policy 146 may be measured or indicated by the replacement counter 143 (included by cache replacement unit 144). In such an embodiment, when a cache miss occurs to a leader cache set associated with the first cache replacement policy (Policy A) the replacement counter 143 may be incremented. When a cache miss occurs to a leader cache set associated with the second cache replacement policy (Policy B) the replacement counter 143 may be decremented. It is understood that the above are merely a few illustrative examples to which the disclosed subject matter is not limited.

Ideally, one of the plurality of cache replacement polices 146 may prove to be more efficient or accurate than the other. In such an embodiment, the cache replacement unit 144 may employ the dominant cache replacement policy 146 when dealing with the other, non-leader cache sets. As described above, these non-leader cache sets may comprise the majority of the cache (e.g., the L1 cache 116). In such an embodiment, the cache replacement unit 144 may determine a cache replacement policy for the majority of the cache.

In the illustrated embodiment, the dominant cache replacement policy 146 may change over time. As the type of data changes, the previously dominate policy (e.g., Policy B) may cease to be as efficient or accurate. In such an embodiment, another candidate policy (e.g., Policy A) may become more accurate and may then assume the role as dominant cache replacement policy 146. The non-leader cache sets may then be replaced using the new dominant policy (e.g., Policy A). In such an embodiment, the cache replacement policy used for the majority of the cache may be automatically and dynamically altered.

In various embodiments, the number of leader cache sets may be dynamically altered as well. Traditionally the number of leader cache sets is statically determined at start-up or via a manually set variable and never changes during active execution. This had a number of issues. If the number of the leader cache sets was too low, the count (replacement counter 143) may not accurately predict and respond to changes in the cache's behavior. Conversely, if the number of the leader cache sets was too high, that could hurt performance on workloads where just one policy was significantly better for performance. The performance loss would be attributed to the leader sets of the lower performing policy. In the illustrated embodiment, the number of leader cache sets and their associations may be automatically and dynamically changed.

For example, if the cache replacement unit 144 detects (via the replacement counter 143) that one of the candidate policies 146 is clearly dominant, the cache replacement unit 144 may reduce the number of leader cache sets. This may increase the overall number of cache sets (both leader and non-leader) that follow the dominant policy and may reduce the monitoring overhead on the cache replacement unit 144. Conversely, if neither candidate policy is dominant, the cache replacement unit 144 may increase the number of leader cache sets. This may increase the sample size of the monitored cache sets and allow the cache replacement unit 144 to more quickly respond to changing conditions. As a policy loses or gains partial dominance, the number of leader cache sets may be decreased or increased, respectively.

In various embodiments, the cache replacement unit 144 may also be configured to change non-leader cache sets to leader cache sets and vice versa. The cache replacement unit 144 may also be configured to associate or disassociate leader cache sets with various cache replacement policies 146. In such an embodiment, this may allow the cache replacement unit 144 to maintain a defined ratio or equal number of sampled cache sets for each policy.

In various embodiments, the cache replacement unit 144 may employ a dynamic scaling technique when increasing or decreasing the number of leader cache sets. For example, when an increase occurs, the cache replacement unit 144 may double the number of leader cache sets. Likewise, when a decrease occurs, the cache replacement unit 144 may half the number of leader cache sets. It is understood that the above is merely one illustrative example to which the disclosed subject matter is not limited.

In such an embodiment, one or more scaling thresholds may be employed to determine when the number of leader cache sets should be increased or decreased. In such an embodiment, these scaling thresholds may effectively create a number of regions through which a policy must pass through, from a state of co-equal dominance to a state of near total dominance. It is understood that the above are merely a few illustrative examples to which the disclosed subject matter is not limited.

While the examples used herein predominantly focus on two candidate cache replacement policies, it is understood that the system 100 may be employed for any number of policies (e.g., three, four, five). In one embodiment, a number of counters 143 may be employed to count the effectiveness of three or more policies 146.

In another embodiment, a plurality of policies 146 may be simultaneously tried, but the distribution of leader cache sets may not be equal. In such an embodiment, candidate policies deemed more likely to succeed, or that would benefit more from a larger sample set may be given or allocated more leader cache sets, and lesser candidate polices may be allocated fewer leader cache sets. In such an embodiment, some form of weighed counter(s) 143 may be employed. In various embodiments, the allocation of leader cache sets amongst the polices may dynamically change over time. It is understood that the above are merely a few illustrative examples to which the disclosed subject matter is not limited.

To illustrate system 100 with a specific example, two candidate policies 146 (Policies A & B) may be employed. In such an embodiment, the replacement counter 143 may include a 9-bit counter, which may be initialized at a value of 255 (or 0 if a signed counter is used). For each cache miss to a leader cache set associated with Policy A the replacement counter 143 may be incremented. For each cache miss to a leader cache set associated with Policy B the replacement counter 143 may be decremented. The further away from the center-point (e.g., 255, 0) the replacement counter 143 becomes, the more dominant one of the two candidate policies is determined to be. In the illustrated embodiment, the replacement counter 143 may saturate.

Also, in the illustrative embodiment, a number of scaling thresholds may be employed. For example, if the cache includes 1,024 cache sets, the following table may define the scaling thresholds and the way in which the number of leader cache sets would change.

| Minimum Counter Value | Maximum Counter Value | Number of Leader Cache Sets per Policy |
| --- | --- | --- |
| 0 | 63 | 2 |
| 64 | 95 | 4 |
| 96 | 127 | 8 |
| 128 | 159 | 16 |
| 160 | 191 | 32 |
| 192 | 223 | 64 |
| 224 | 287 | 128 |
| 288 | 319 | 64 |
| 320 | 351 | 32 |
| 352 | 383 | 16 |
| 384 | 415 | 8 |
| 416 | 447 | 4 |
| 448 | 511 | 2 |

In such an embodiment, the leader cache sets may be evenly distributed throughout the cache. Likewise, the associations between the leader cache sets and the polices may be evenly distributed or (in the case of two policies) alternating. Leader sets are not tied to a specific policy and can be re-associated to a different policy, or as a non-leader set. For example, if there were 8 leader cache sets per policy in a cache with 1024 cache sets, every $64^{th}$ cache set would be a leader cache set. For example, if there were 16 leader cache sets per policy in a cache with 1024 cache sets, every $32^{nd}$ cache set would be a leader cache set. It is understood that the above are merely a few illustrative examples to which the disclosed subject matter is not limited.

FIG. 2A is a block diagram of an example embodiment of a system 200 in accordance with the disclosed subject matter. In the illustrated embodiment, a sample cache or memory is shown with a plurality (32) cache sets 201-232. In such an embodiment, a number of these cache sets (shaded) have been designated as leader cache sets, whereas others (unshaded) have been designated as non-leader cache sets. It is understood that the ratio of leader or non-leader cache sets is made higher for illustrative purposes than may be typical in an actual cache embodiment.

In the illustrated embodiment, 8 cache sets have been identified as leader cache sets (cache sets 201, 205, 209, 213, 217, 221, 225, and 229). Of the 8 cache sets, four leader cache sets have been associated with the first replacement policy, Policy A (diagonal shaded; cache sets 201, 209, 217, and 225). Four leader cache sets have been associated with the second replacement policy, Policy B (vertically shaded; cache sets 205, 213, 221, and 229). In the illustrated embodiment, this may be an initial state of the cache system 200.

In various embodiments, when a cache miss (access 252) occurs to a Policy A associated cache set 201, the replacement counter (shown in FIG. 1) may increment to show that Policy A has not been as effective as desired. Therefore, Policy A may be considered less dominant than it was before the cache miss 252.

Likewise, when a cache miss (access 254) occurs to a Policy B associated cache set 213, the replacement counter (shown in FIG. 1) may decrement to show that Policy B has not been as effective as desired. Therefore, Policy B may be considered less dominant than it was before the cache miss 254.

Conversely, when a cache miss (access 256) occurs to a non-leader cache set 204, the replacement counter (shown in FIG. 1) may not increment or decrement. Therefore, the dominance relationship between Policies A & B may not change.

In the case of a cache fill, if the cache fill is to a non-leader cache set (access 258), the cache replacement unit (shown in FIG. 1) may chose a policy for fill insertion based upon whichever policy is currently dominant. In such an embodiment, this may be determined by the value of replacement counter (shown in FIG. 1).

If the cache fill is to a leader cache set (access 257 or 259), the cache replacement unit (shown in FIG. 1) may use, for fill insertion, the policy associated with the leader cache set (cache sets 221 & 225, respectively). For example, for cache fill 259 Policy A would be employed and for cache fill 257 Policy B would be employed.

FIG. 2B is a block diagram of an example embodiment of a system 200 in accordance with the disclosed subject matter. In the illustrated embodiment, a sample cache or memory is shown with a plurality (32) cache sets 201-232. In such an embodiment, one of the two policies (e.g., Policy A) may have become more dominant and the counter may have crossed or met a scaling threshold. In such an embodiment, the number of leader cache sets may have been decreased or, in this instance, halved (compared to that of FIG. 2A).

In the illustrated embodiment, four cache sets have been identified as leader cache sets (cache sets 201, 209, 217, and 225). In such an embodiment, four previously identified leader cache sets (cache sets 205, 213, 221, and 229) may be no longer considered leaders and may instead by non-leader cache sets.

Of those, two leader cache sets have been associated with the first replacement policy, Policy A (diagonal shaded; cache sets 201, and 217). Two leader cache sets have been associated with the second replacement policy, Policy B (vertically shaded; cache sets 209 and 225). It is noted that compared to FIG. 2A, cache sets 209 and 225 have been re-associated with Policy B from Policy A.

In various embodiments, when a cache miss (access 262) occurs to a Policy A associated cache set 201, the replacement counter (shown in FIG. 1) may increment to show that Policy A has not been as effective as desired. Therefore, Policy A may be considered less dominant than it was before the cache miss 262.

Likewise, when a cache miss (access 264) occurs to a Policy B associated cache set 209, the replacement counter (shown in FIG. 1) may decrement to show that Policy B has not been as effective as desired. Therefore, Policy B may be considered less dominant than it was before the cache miss 264.

Conversely, when a cache miss (access 266) occurs to a non-leader cache set 213, the replacement counter (shown in FIG. 1) may not increment or decrement. Therefore, the dominance relationship between Policies A & B may not change.

In the case of a cache fill, if the cache fill is to a non-leader cache set (access 268), the cache replacement unit (shown in FIG. 1) may chose a policy for fill insertion based upon whichever policy is currently dominant. In such an embodiment, this may be determined by the value of replacement counter (shown in FIG. 1).

FIG. 2C is a block diagram of an example embodiment of a system 200 in accordance with the disclosed subject matter. In the illustrated embodiment, a sample cache or memory is shown with a plurality (32) cache sets 201-232. In such an embodiment, one of the two policies (e.g., Policy A) may have become less dominant (compared to FIG. 2A) and the counter may have crossed or met a scaling threshold. In such an embodiment, the number of leader cache sets may have been increased or, in this instance, doubled (compared to FIG. 2A).

In the illustrated embodiment, 16 cache sets have been identified as leader cache sets (cache sets 201, 203, 205, 207, 209, 211, 213, 215, 217, 219, 221, 223, 225, 227 and 229). Of those, 8 leader cache sets have been associated with the first replacement policy, Policy A (diagonal shaded; cache sets 201, 205, 209, 213, 217, 221, and 225). Eight leader cache sets have been associated with the second replacement policy, Policy B (vertically shaded; cache sets 203, 207, 211, 215, 219, 223, 227, and 231). It is understood that the above is merely an illustrative example and a typical embodiment may not include a leader to non-leader cache set ratio that is so skewed towards leader cache sets.

In various embodiments, when a cache miss (access 272) occurs to a Policy A associated cache set 201, the replacement counter (shown in FIG. 1) may increment to show that Policy A has not been as effective as desired. Therefore, Policy A may be considered less dominant than it was before the cache miss 272.

Likewise, when a cache miss (access 274) occurs to a Policy B associated cache set 211, the replacement counter (shown in FIG. 1) may decrement to show that Policy B has not been as effective as desired. Therefore, Policy B may be considered less dominant than it was before the cache miss 274.

Conversely, when a cache miss (access 276) occurs to a non-leader cache set 204, the replacement counter (shown in FIG. 1) may not increment or decrement. Therefore, the dominance relationship between Policies A & B may not change.

In the case of a cache fill, if the cache fill is to a non-leader cache set (access 278), the cache replacement unit (shown in FIG. 1) may chose a policy for fill insertion based upon whichever policy is currently dominant. In such an embodiment, this may be determined by the value of replacement counter (shown in FIG. 1).

If the cache fill is to a leader cache set (access 277 or 279), the cache replacement unit (shown in FIG. 1) may use, for fill insertion, the policy associated with the leader cache set (cache sets 219 & 221, respectively). For example, for cache fill 279 Policy A would be employed and for cache fill 277 Policy B would be employed.

Figure 3:
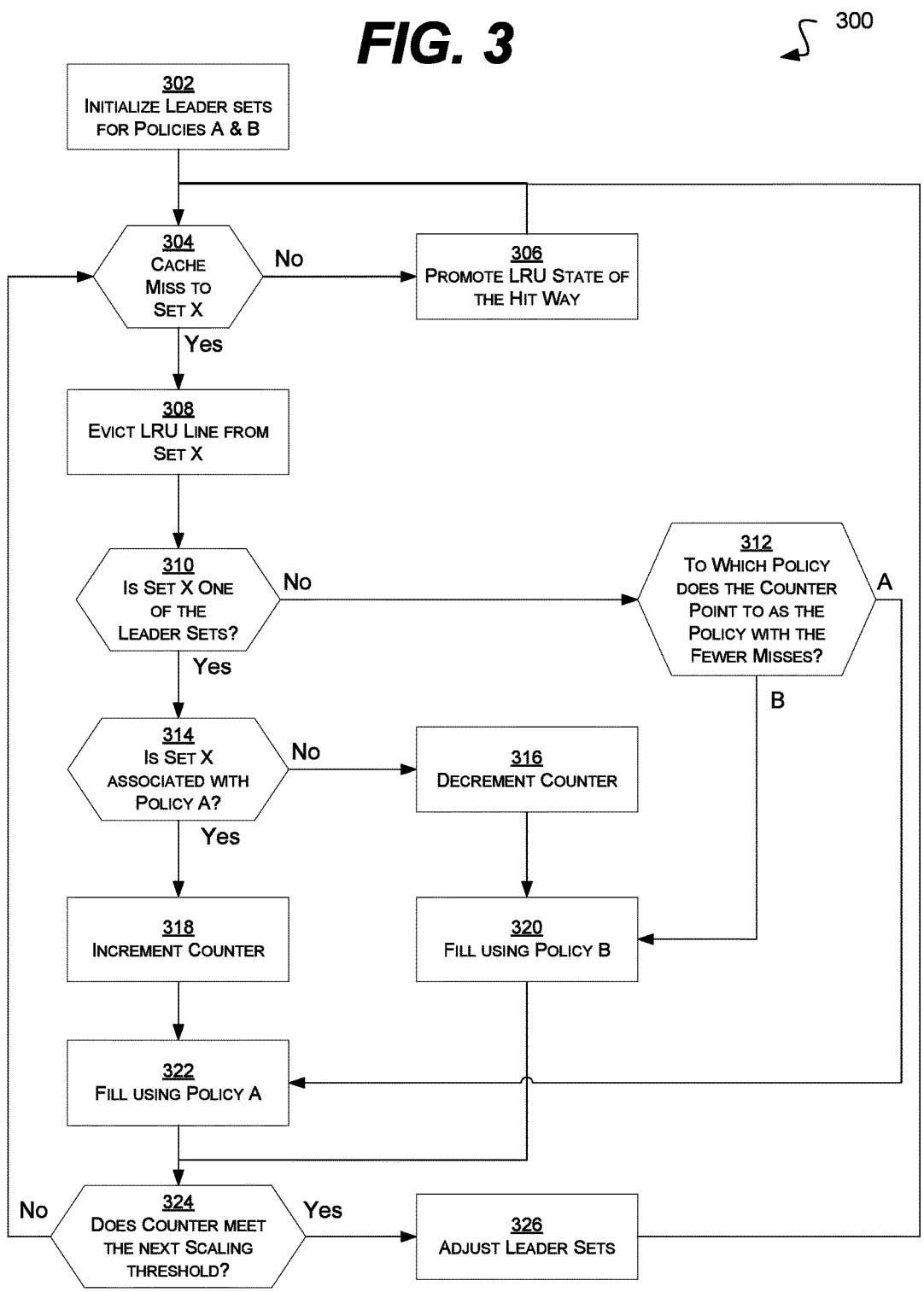
FIG. 3 is a flowchart of an example embodiment of a technique in accordance with the disclosed subject matter.

FIG. 3 is a flowchart of an example embodiment of a technique 300 in accordance with the disclosed subject matter. In various embodiments, the technique 300 may be used or produced by the systems such as those of FIG. 1 or 4. Furthermore, portions of technique 300 may be used to produce systems such as those of FIG. 2A, 2B, or 2C. Although, it is understood that the above are merely a few illustrative examples to which the disclosed subject matter is not limited. It is understood that the disclosed subject matter is not limited to the ordering of or number of actions illustrated by technique 300.

Block 302 illustrates that, in one embodiment, the cache may be initialized with a defined set or group of leader cache sets. In various embodiments, these leader cache sets may be associated with the candidate policies (e.g., Policies A & B).

Block 304 illustrates that, in one embodiment, it may be determined if a cache miss occurs to a given cache set (e.g., cache set X). Block 306 illustrates that, in one embodiment, if no cache miss has occurred, the least recently used (LRU) state of the targeted cache set may be increased or otherwise promoted. Whereas, Block 308 illustrates that, in one embodiment, if a cache miss has occurred, one of the cache lines may be evicted. In some embodiments, a LRU scheme may be employed to select the victim cache line.

Block 310 illustrates that, in one embodiment, it may be determined whether or not the target cache set (cache set X) is one of the leader cache sets. If not, then Block 312 illustrates that, in one embodiment, a determination may be made as to which policy (e.g., policy A or B) is currently dominant. In one such embodiment, this determination may be made based upon a value held by the counter.

Block 314 illustrates that, in one embodiment, if the target cache set is a leader cache set, a determination may be made as to which policy is associated with the leader set. Block 318 illustrates that, in one embodiment, if the associated policy is the first policy (Policy A) the counter may be incremented. Conversely, Block 316 illustrates that, in one embodiment, if the associated policy is the second policy (Policy B) the counter may be decremented.

Block 320 illustrates that, in one embodiment, the cache set may be filled using the second policy (Policy B). This may occur if the target cache set is associated with the second policy (via Blocks 314 and 316) or if the dominating policy is the second policy (via Block 312).

Block 322 illustrates that, in one embodiment, the cache set may be filled using the first policy (Policy A). This may occur if the target cache set is associated with the first policy (via Blocks 314 and 318) or if the dominating policy is the first policy (via Block 312).

Block 324 illustrates that, in one embodiment, a determination may be made as to whether the counter has crossed or meet a scaling threshold (via Blocks 316 or 318). If so, Block 326 illustrates that, in one embodiment, the threshold values and the leader cache sets may be adjusted. In such an embodiment, this may include moving the minimum and maximum threshold values to the next scaling region (e.g., that shown in the table above). In such an embodiment, the number of leader cache sets may be altered, and the leader cache set's associations with the policies may likewise be altered.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers, and so on or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR, and so on), stabilizing logic devices (e.g., flip-flops, latches, and so on), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM), and so on). The information processing system 400 according to the disclosed subject matter may further include a non-volatile memory 430 (e.g., a hard drive, an optical memory, a NAND or Flash memory, and so on). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-If protocol may include, but are not limited to, Institute of Electrical and Electronics Engineers (IEEE) 802.11g, IEEE 802.11n, and so on. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), and so on. Examples of a wired protocol may include, but are not limited to, IEEE 802.3 (a.k.a. Ethernet), Fibre Channel, Power Line communication (e.g., HomePlug, IEEE 1901, and so on), and so on. It is understood that the above are merely a few illustrative examples to which the disclosed subject matter is not limited.

The information processing system 400 according to the disclosed subject matter may further include a user interface unit 450 (e.g., a display adapter, a haptic interface, a human interface device, and so on). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor, and so on). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440, and so on) of the information processing system 400. In such an embodiment, the information processing system 400 may include one or more native applications, which may be installed locally (e.g., within the non-volatile memory 430, and so on) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey, and so on) or a virtual execution machine (VM) (e.g., the Java Virtual Machine, the Microsoft Common Language Runtime, and so on) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, and so on). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a cache arranged in a plurality of cache sets, each cache set configured to store data, wherein a number of cache sets are designated as leader cache sets, wherein a leader cache set is a cache set whose performance is monitored and taken as a representative indicator of an efficacy of a replacement policy, and a first leader cache set is associated with a first replacement policy and, at least, a second leader cache set is associated with a second replacement policy; and
a cache replacement unit configured to:
monitor an effectiveness of the first replacement policy and, at least, the second replacement policy to accurately predict cache line replacement,
select, based upon the effectiveness, either the first replacement policy or, at least, the second replacement policy to be a dominant replacement policy, and
dynamically scale the number of cache sets that are designated as leader cache sets based at least in part upon the effectiveness of the dominant replacement policy.

2. The apparatus of claim 1, wherein the cache replacement unit is configured to:
decrease the number of leader cache sets as the effectiveness of the dominant replacement policy increases; and
increase the number of leader cache sets as the effectiveness of the dominant replacement policy decreases.

3. The apparatus of claim 1, wherein the cache replacement unit is configured to:
dynamically alter the number of cache sets that are designated as leader cache sets,
dynamically alter which cache sets are designated as leader cache sets, and
dynamically alter which replacement policy each respective leader cache set is associated with.

4. The apparatus of claim 1, wherein the cache replacement unit comprises a miss counter configured to indicate a level of dominance of one replacement policy compared to at least one other replacement policy based upon one of a number of cache misses and a metric for predicting best system performance.

5. The apparatus of claim 4, wherein the cache replacement unit comprises a plurality of scaling thresholds that define leader set scaling regions, wherein each leader set scaling region defines how many cache sets are designated leader cache sets, and
wherein the cache replacement unit is configured to, when the miss counter traverses a scaling threshold, dynamically scale the number of cache sets that are designated as leader cache sets based upon an active leader set scaling region.

6. The apparatus of claim 1, wherein a cache replacement unit configured to dynamically scale the number of cache sets that are designated as leader cache sets by a scaling ratio based at least in part upon the effectiveness of the dominant replacement policy.

7. The apparatus of claim 1, wherein each leader cache set is associated with either the first replacement policy, the second replacement policy, or, at least, a third replacement policy; and
wherein the cache replacement unit is configured to:
monitor an effectiveness of the first replacement policy, the second replacement policy, and, at least, the third replacement policy to accurately predict cache line eviction, and
select either the first replacement policy, the second replacement policy, and, at least, the third replacement policy to be the dominant replacement policy.

8. The apparatus of claim 1, wherein a majority of cache sets are not designated as leader cache sets and are non-leader cache sets; and
wherein the cache replacement unit is configured to:
store data in the non-leader cache set according to the dominant replacement policy, and
dynamically alter, based at least in part upon the effectiveness of the dominant replacement policy, which cache sets are leader cache sets and which cache sets are non-leader cache sets.

9. A method comprising:
arranging a cache in a plurality of cache sets, each cache set configured to store data, wherein a number of cache sets are designated as leader cache sets, wherein a leader cache set is a cache set whose performance is monitored and taken as a representative indicator of an efficacy of a replacement policy, and a first leader cache set is associated with a first replacement policy and, at least, a second leader cache set is associated with a second replacement policy;
monitoring an effectiveness of the first replacement policy and, at least, the second replacement policy to accurately predict cache line replacement, wherein whichever replacement policy is the more effective replacement policy is deemed a dominant replacement policy; and
dynamically scaling the number of cache sets that are designated as leader cache sets based at least in part upon the effectiveness of the dominant replacement policy.

10. The method of claim 9, wherein dynamic scaling comprises decreasing the number of leader cache sets as the effectiveness of the dominant replacement policy increases; and
wherein dynamic scaling comprises increasing the number of leader cache sets as the effectiveness of the dominant replacement policy decreases.

11. The method of claim 9, wherein dynamic scaling comprises:
altering the number of cache sets are designated as leader cache sets, dynamically altering which cache sets are designated as leader cache sets, and
dynamically altering which replacement policy each respective leader cache set is associated with.

12. The method of claim 9, wherein monitoring comprises comparing a number of cache misses attributable to each replacement policy, and, based upon the number of cache misses, establishing a level of dominance of one replacement policy compared to at least one other replacement policy.

13. The method of claim 12, wherein dynamically scaling comprises:
establishing a plurality of scaling thresholds that define leader set scaling regions, wherein each leader set scaling region defines how many cache sets are designated leader cache sets, and
when the miss counter traverses a scaling threshold, dynamically changing the number of cache sets that are designated as leader cache sets based upon an active leader set scaling region.

14. The method of claim 9, further comprising dynamically scaling the number of cache sets that are designated as leader cache sets by a scaling ratio based at least in part upon the effectiveness of the dominant replacement policy.

15. The method of claim 9, wherein each leader cache set is associated with one of a plurality of replacement policies, wherein the plurality comprises more than two replacement polices; and
wherein monitoring comprises monitoring the effectiveness of the plurality of replacement policies.

16. The method of claim 9, wherein a majority of cache sets are not designated as leader cache sets and are non-leader cache sets;
wherein the method further comprises storing data in the non-leader cache set according to the dominant replacement policy; and
wherein dynamic scaling comprises dynamically altering, based at least in part upon the effectiveness of the dominant replacement policy, which cache sets are leader cache sets and which cache sets are non-leader cache sets.

17. An apparatus comprising:
an execution circuit configured to execute instructions and request data from a cache;
the cache arranged in a plurality of cache sets, each cache set configured to store data, wherein a number of cache sets are designated as leader cache sets, wherein a leader cache set is a cache set whose performance is monitored and taken as a representative indicator of an efficacy of a replacement policy, and a first leader cache set is associated with a first replacement policy and, at least, a second leader cache set is associated with a second replacement policy; and
a memory manager circuit configured to:
monitor an effectiveness of the first replacement policy and, at least, the second replacement policy to accurately predict cache line replacement,
select, based upon the effectiveness, either the first replacement policy and, at least, the second replacement policy to be a dominant replacement policy, and
dynamically scale, based at least in part upon the effectiveness of the dominant replacement policy, the number of cache sets that are designated as leader cache sets.

18. The apparatus of claim 17, wherein the memory management circuit is configured to:
decrease the number of leader cache sets as the effectiveness of the dominant replacement policy increases; and
increase the number of leader cache sets as the effectiveness of the dominant replacement policy decreases.

19. The apparatus of claim 17, wherein the memory management circuit comprises:

a miss counter configured to indicate a level of dominance of one replacement policy compared to at least one other replacement policy based upon one of a number of cache misses and a metric for predicting best system performance; and a plurality of scaling thresholds that define leader set scaling regions, wherein each leader set scaling region defines how many cache sets are designated leader cache sets, and wherein the memory management circuit is configured to, when the miss counter traverses a scaling threshold, dynamically scale the number of cache sets that are designated as leader cache sets based upon an active leader set scaling region.

20. The apparatus of claim 17, wherein a majority of cache sets are not designated as leader cache sets and are non-leader cache sets; and wherein the memory management circuit is configured to:
store data in the non-leader cache set according to the dominant replacement policy, and
dynamically alter, based at least in part upon the effectiveness of the dominant replacement policy, which cache sets are leader cache sets and which cache sets are non-leader cache sets.

* * * * *